(12) United States Patent
Skarbo et al.

(10) Patent No.: US 6,317,777 B1
(45) Date of Patent: Nov. 13, 2001

(54) METHOD FOR WEB BASED STORAGE AND RETRIEVAL OF DOCUMENTS

(75) Inventors: Rune A. Skarbo; Cameron J. Clitheroe, both of Hillsboro; Christopher C. Lawless, Forest Grove; Puneet Kukkal; Stephen D. Hochman, both of Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/299,808

(22) Filed: Apr. 26, 1999

(51) Int. Cl.[7] ................................................. G06F 15/16
(52) U.S. Cl. ........................ 709/204; 709/205; 709/203
(58) Field of Search ................................... 709/205, 204, 709/203, 202; 345/330; 379/202, 205; 370/260, 484

(56) References Cited

U.S. PATENT DOCUMENTS

| | | | |
|---|---|---|---|
| 5,351,276 | * | 9/1994 | Doll, Jr. et al. .................... 379/67 |
| 5,689,641 | * | 11/1997 | Ludwig et al. ..................... 709/204 |
| 5,781,732 | * | 7/1998 | Adams ................................ 709/205 |
| 5,848,248 | * | 12/1998 | Kawasaki et al. .................. 709/205 |
| 5,916,302 | * | 6/1999 | Dunn et al. ......................... 709/204 |
| 5,923,845 | * | 7/1999 | Kamiya et al. ..................... 709/205 |
| 5,974,446 | * | 10/1999 | Sonnenreich et al. .............. 709/204 |
| 5,996,003 | * | 11/1999 | Namikata et al. .................. 709/205 |
| 6,105,055 | * | 8/2000 | Pizano et al. ....................... 709/204 |
| 6,119,147 | * | 9/2000 | Toomey et al. ..................... 709/204 |
| 6,144,991 | * | 11/2000 | England ............................... 709/205 |
| 6,155,840 | * | 12/2000 | Sallette .............................. 709/204 |

FOREIGN PATENT DOCUMENTS

| | | |
|---|---|---|
| 0 319 232 A2 | 11/1988 | (EP) . |
| 0 473 960 A2 | 8/1991 | (EP) . |
| 0 874 232 A1 | 4/1998 | (EP) . |
| 0 891 063 A2 | 6/1998 | (EP) . |

OTHER PUBLICATIONS

Stephan Jacobs, Michael Gebhardt, Stefanie Kethers, & Wojtek Rzasa; "Filing HTML forms simultaneously: CoWeb–architecture and functionality".

Computer Networks and ISDN Systems, 1996, pp. 1385–1395, Published by Elsevier Science B.V.

PCT International Search Report for International Application No. PCT/US 00/10152 dated Jul. 24, 2000.

* cited by examiner

Primary Examiner—Mehmet B. Geckil
(74) Attorney, Agent, or Firm—Blakely, Sokoloff, Taylor & Zafman LLP (57) ABSTRACT

A document-collaboration videoconferencing system between a first and a second conference attendee. In one embodiment, the system comprises a document server, a local presenter computing system, and a conferencing computing system. In this embodiment, the local presenter computing system transfers a document to the document server over a network, and the first conferencing system copies such document over the network from the document server.

18 Claims, 7 Drawing Sheets

METHOD FOR WEB BASED STORAGE AND RETRIEVAL OF DOCUMENTS

FIELD OF THE INVENTION

The field of the invention generally relates to data collaboration during video conferences, and more particularly to robustly providing such data to a conference participant's videoconference equipment.

BACKGROUND

In recent years, much progress has been made towards providing efficient and convenient methods for engaging in videoconferences in which conference participants can share and collaborate on program data files. However, due to the cost and complexity of the conferencing equipment, businesses typically have few (if any) videoconferencing configurations on premises. It is also common to have to go to third-party providers of conferencing equipment in order to complete a videoconference session.

Since the goal of collaborative videoconferencing is the sharing of data, a fundamental requirement is that the data be brought to the conferencing premises. Unfortunately, getting the data to the conferencing equipment is not a simple task. Generally, the data can be quite large, and there are few easily portable resources that also have capacity to hold large data. In addition, even if the data fits on certain large capacity portable media, there is no guarantee that the conference location will support the media. In addition, media is frequently lost or damaged in transit to the conference.

One alternative to manually carrying presentation data to a conference has been to map, over a network, a local drive letter on the conferencing equipment to a source computer (e.g., a presenter's desktop computer containing presentation files). Then one can use normal operating system commands to copy the requisite data to the conference equipment. However, this solution is problematic, since managing networking connections can be difficult, and the conference curtailed or derailed if improper permissions or other issues prevent the mapping. In addition, for security purposes, conferencing equipment is typically running an exclusive application program that prevents a presenter from manipulating the underlying operating system of the conference equipment in order to effect the drive mapping.

What is needed, then, is a way to reliably get conferencing data to conference participants, while utilizing standard applications.

SUMMARY

A document-collaboration videoconferencing system between a first and a second conference attendee. In one embodiment, the system comprises a document server, a local presenter computing system, and a conferencing computing system. In this embodiment, the local presenter computing system transfers a document to the document server over a network, and the first conferencing system copies such document over the network from the document server.

DETAILED DESCRIPTION

Figure 1A:
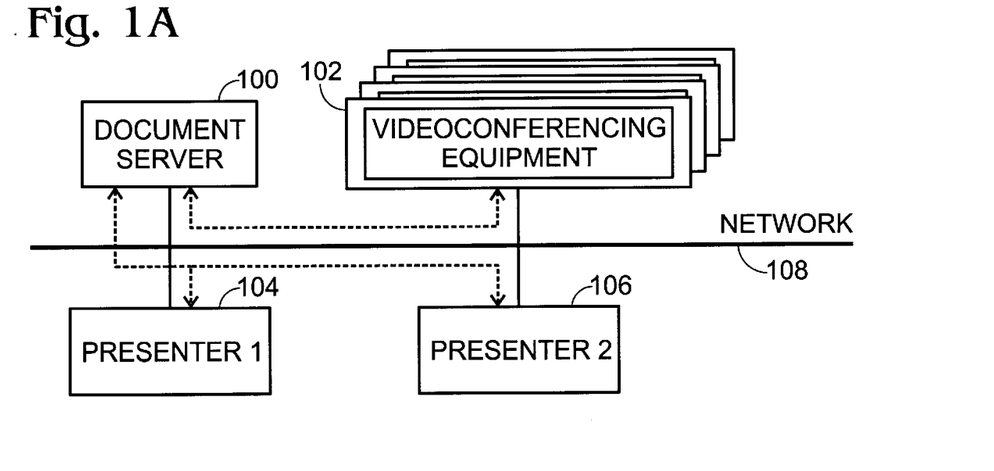
FIG. 1A illustrates a typical configuration of computing devices used to effect collaborative data sharing during a video conference.

FIG. 1 illustrates a typical configuration of computing devices used to effect collaborative data sharing during a video conference. As shown, there is a document server 100, a conferencing installation (videoconferencing equipment 102), and two conference participants, presenter 1 104, and presenter 2 106. (Note that the server 100 and videoconferencing equipment 102 may be incorporated into a single computing device.) Each of these computing devices is interconnected by a network 108. For simplicity, it is presumed that the network is a Transmission Control Protocol/Internet Protocol (TCP/IP) network, since TCP/IP has strong guarantees of data integrity. However, other networking protocols such as the Internet Control Message Protocol (ICMP) extension to TCP/IP, Internetwork Packet eXchange (IPX), Sequenced Packet Exchange (SPX), AppleTalk, or the like can also be used. The network 108 may be a single physical link, or a logical structure crafted from a combination of physical and non-physical data pathways (e.g., analog or digital dialup connections, satellite links, etc.).

In one embodiment, the document server comprises the combination of web-client software on each client device (e.g., a presenter) 104, 106, and web-server software on the server 100. For example, the presenters 104, 106 can utilize web browsers and receive active HTML content (or Java, JavaScript, JScript, ActiveX, Visual Basic, Active Server Page (ASP) files, and the like) to interact with the server; and the server can incorporate web-server extensions (e.g., DLLs 112 (FIG. 1B), databases 114 (FIG. 1B), etc.) or a complete server installation (e.g., an Apache web server).

In a typical configuration, the document server 100 makes conference documents available to videoconferencing equipment 102. (Each conference attendee utilizes a videoconferencing equipment to participate in the conference.) For example, as a conference is started, the conference installation can download a copy of the documents from the document server. After the conference is completed, the conference installation can then return any modified documents back to the document server. During the conference, each attendee's system may retrieve a copy of the documents, or only be given a view onto the documents, depending on the nature of the collaboration configuration.

For example, if the conference included sharing a word processing document, there are several methods of sharing the document. A first is to have all participants obtain a copy of the document, work on it locally, while the conference software automatically propagates changes to the other participant's copies. A second is to open the document on the presenter's machine, and to mimic a view of the document on other attendee's machines. In this configuration, a presenter's mouse, keyboard and other windowing events are captured and forwarded to the other attendees. Similarly, their attempts to work with the copy will cause the events to be forwarded to the presenter, where the edits are actually performed and an updated screen image sent back to the other attendees. In effect, this transparently emulates local editing of documents located on the presenter's machine.

Figure 1B:
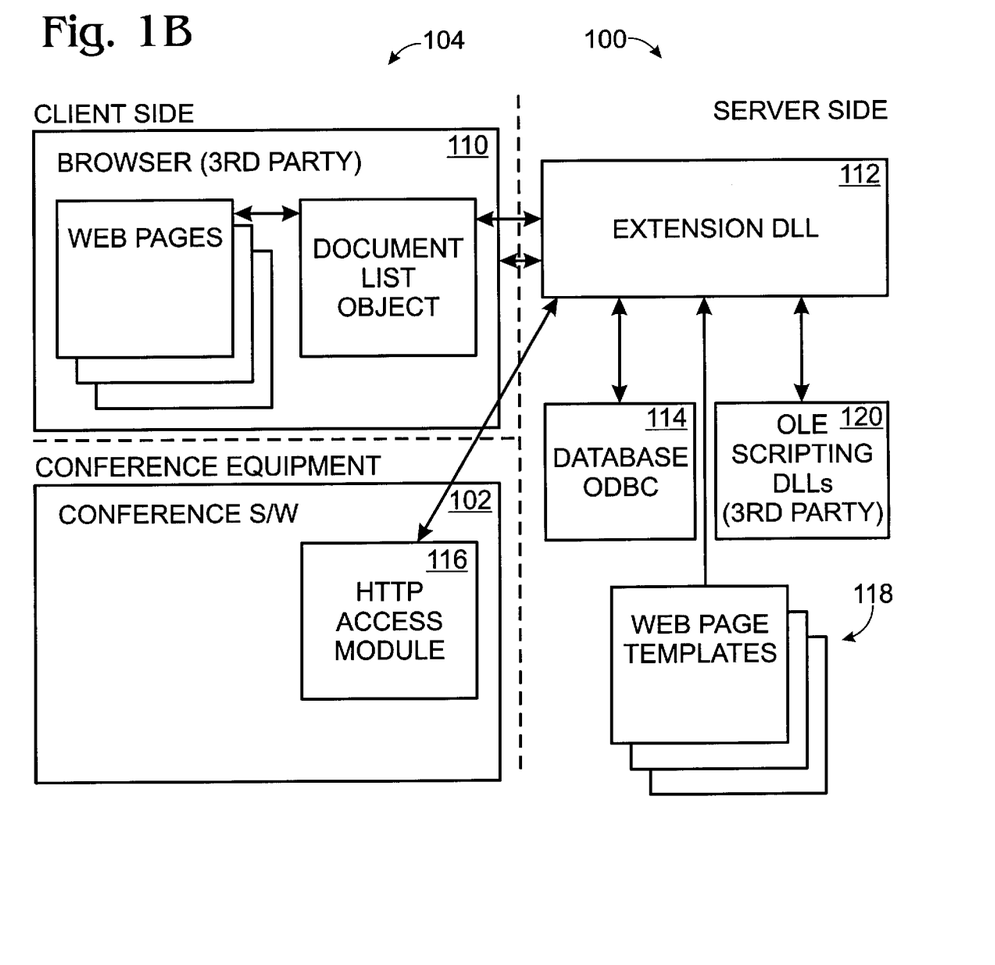
FIG. 1B illustrates an information flow diagram for FIG. 1A.

FIG. 1B illustrates an information flow diagram for the FIG. 1A configuration. As shown, conference presenter 1 104 utilizes a web browser 110 to communicate with the document server 100 in order to submit all conference documents to the document server. Since a web browser is used to submit documents to the server 100, any browser in communication with the server can be used. (The document server 100 provides a user interface including web pages and active content displayed by a web browser 110.) After this has been completed, the presenter 104 attends the conference and begins utilizing videoconferencing equipment 102. With this equipment 102, the presenter contacts the document server 100 and retrieves the conference documents. (Any videoconferencing equipment can retrieve the documents.) As illustrated, in one embodiment, embedded HTTP functionality (HTTP access module 116) within the videoconferencing equipment is used to cause transfer of the document server documents to the presenter's 104 videoconferencing equipment 102.

In one configuration, the document server is implemented on a server as a combination of web page templates 118, extension DLL(s) 112, and server scripts 120. Scripting can be implemented using ActiveX, Java script, VBScript, or the like. The document server extension DLL(s) 112 provide the necessary Internet Server API (ISAPI) entry points to interface with web servers that require ISAPI. (ISAPI is a programming interface allowing web pages to invoke programs written as DLLs on a web server, and is an alternative to Common Gateway Interface (CGI) scripts; ISAPI can be used to access data in a database. Microsoft's Internet Information Server (IIS), for example, provides a DLL for embedding queries to access ODBC-compliant databases.)

In one embodiment, the ISAPI entry points are GetExtensionVersion( ), HttpExtensionProc( ), aid TerminateExtensiono( ). The GetExtensionVersion( ) API is called when the server loads the extension DLL and TerminateExtension( )is called when the DLL is unloading. These APIs will contain standard implementations. The HttpExtensionProc( ) API will determine the action required by the document server and call the appropriate common document server service API. Microsoft Corporation's Visual C++5.0 provides an MFC CHttpServer class which handles most of the standard extension DLL functionality; other compiler environments offer equivalent HTTP support.

In one configuration, the database 114 stores each user/ presenter's 104, 106 account information and document information. The database will be accessed from the extension DLL 112 using ODBC drivers on the server 100. (A set of ODBC extension DLLs called Internet Database Connectors are also available to provide easier database access from the extension DLL.) These DLLs are usable by a NetScape API (NSAPI)/ISAPI implemented extension DLL. (NSAPI is by Netscape Communications Co. of Mountain View, Calif., and essentially parallels ISAPI.) The database format can be any format accessible through DLLs, such as Microsoft Access, Inprise's DBase, and SQL formats (e.g., an SQL database by Oracle Corporation of Redwood Shores, Calif.). Through ODBC, the database 114 will allow the sharing of the database amongst multiple document server servers.

Figure 2:
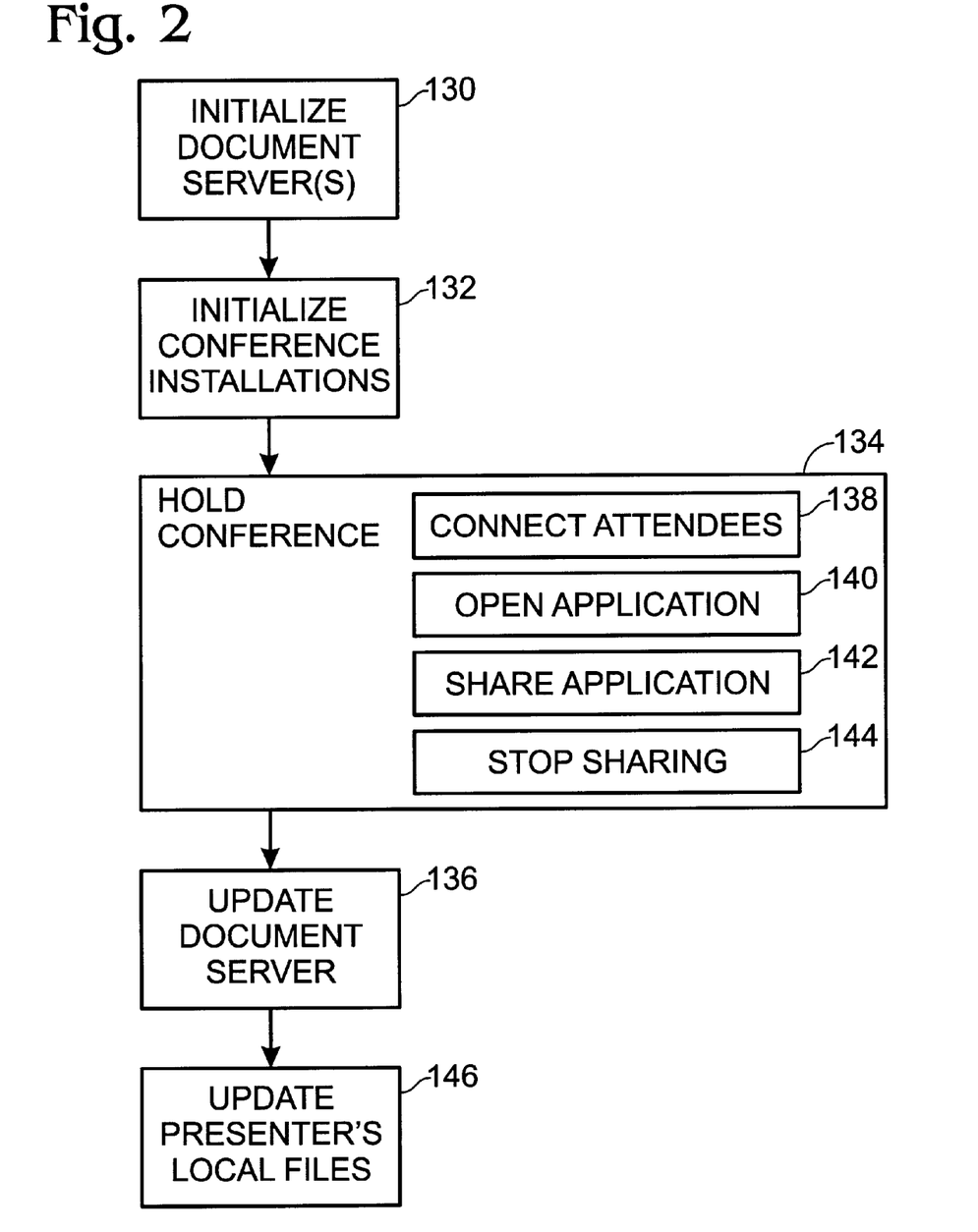
FIG. 2 illustrates starting and ending a data collaboration conference.

FIG. 2 is a flowchart illustrating starting and ending a data collaboration conference. As shown, the first step 130 is initializing document servers to be used during the conference session. For simplicity, it is assumed herein that there is only a single document server, however multiple servers may be used in a distributed context. For example, a public access directory can be used to list accessible document servers according to certain criteria, e.g., geographic location, or processing ability. Initialization of a document server includes obtaining a presenter's local files and copying them to the document server.

Since the document server is presumed to incorporate a web server or server extensions for its operating system, it is expected that Hypertext Markup Language (HTML) tags (or equivalents) are used to cause transfer of local presenter documents to the document server. (HTML is a document format based on the Standard Generalized Markup Language (SMGL) that uses "tags" to flag formatting, structure, data access, etc.) Thus, to cause copying of local files to the document server, a web form can be presented to a user, in which is embedded a file copy tag. When the user submits the form back to the server, file data is sent along with it.

Figure 3:
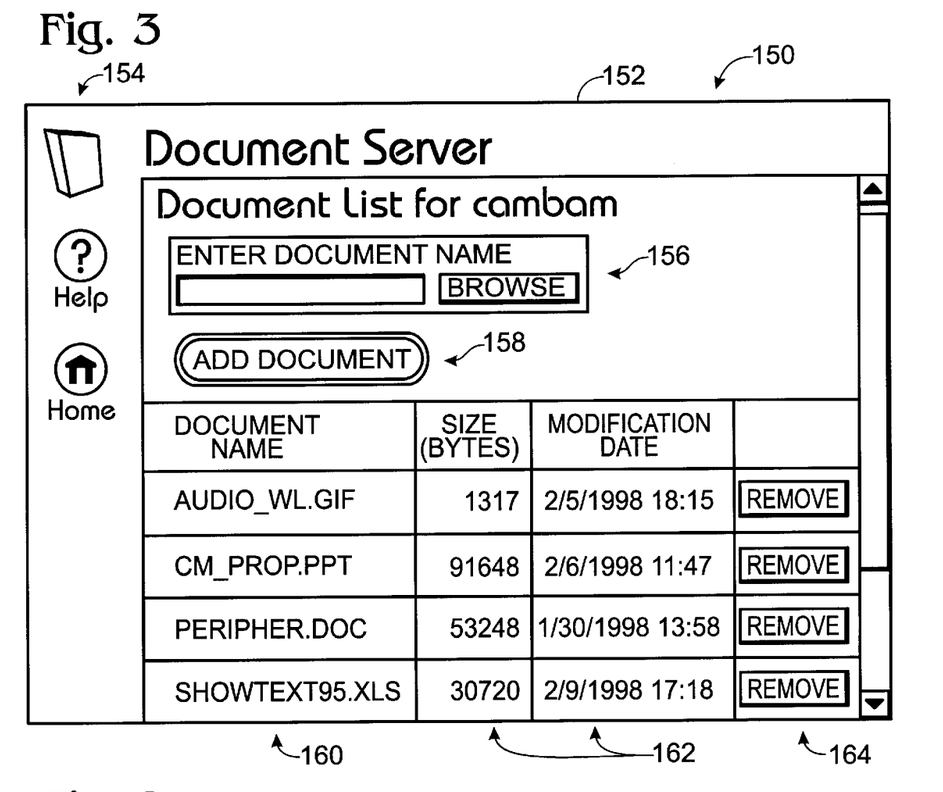
FIG. 3 illustrates a form for uploading data to a document server.

For example, FIG. 3 illustrates a sample form that can be sent to a presenter seeking to upload conference material to a document server. As shown, there is a title bar 150 in which is contained the name 152 of a document server (here the server's name is "document server"). Along the left column 154 can be presented various interface options, such as help support, etc. Within the form itself are several form elements.

A first element is a document name entry field 156 in which a presenter can enter (or browse for) a name for a document to send to the document server.

A second element is a submission button 158 that causes the named file to be uploaded to the document server. (Due to HTML security models, the web page cannot directly request file data; a user must actively submit a form to which is attached the file data. This restriction is not present in other page description formats utilizing ActiveX (or equivalent) controls.) A third element is a file list 160 which indicates all files that the presenter has already identified and sent to the document server. Associated with each uploaded file are attributes 162, such as file size and modification date, that allow the server to identify post-conference which files were modified during the conference. Also present are remove controls 164 that allow erroneously uploaded files to be removed from the document server. Documents may also be removed after a presenter's local copy of a document has been updated after a conference has ended.

It will be understood by one skilled in the art that even though FIG. 3 shows a list format for the files, a hierarchical folder view may be used instead.

For example, in such a configuration, the left column 154 could contain commands for opening, closing, moving, renaming, creating and deleting a selected folder. In addition, as is customary in windowing environments, mouse operations (or keyboard selection) can be used to indicate operation of such commands.

Continuing now with FIG. 2, after initializing the document server 130, the next step is to initialize the conference installations 132 (e.g. attendees utilizing videoconferencing equipment 102 of FIG. 1). Typically, one of the conference installations corresponds to the presenter, unless the presenter's conference installation and the document server are implemented on the same computing device. Among other conference initialization operations, each participant connects to the document server and retrieves the working documents for the collaborative conference event.

The next step 134 is to hold the conference itself. As noted above, it is presumed that a typical video conference is taking place, within which document collaboration is taking place. Since video conferencing without document collaboration is well known (see, e.g., the H.320 standard), the details of the video portions of the conferencing will not be discussed at length herein. However, to perform document sharing during such a conference, several events must occur.

First, a connection must be made with all other conference participants 138. This requires that each participant support an appropriate data conferencing protocol, such as the International Telecommunications Union (ITU) T.120 protocol for efficient real-time distribution of files and graphical information. (Note T.120 is a general reference to a series of related protocols, e.g., T.121–T.133, T.RES, T.Share, and T.TUD.) An exemplary application supporting the T.120 protocol is the Microsoft® NetMeeting software, which is a point to point telephony and videophone program supporting whiteboard and application sharing.

After all parties are connected, the presenter opens an application program 140 in accord with standard sharing conventions. For example, the presenter could click on a file name in a graphical user interface on the presenter's conferencing equipment, causing the files related application to be loaded with the identified file. Then the presenter actively elects to share 142 the opened application in accord with document sharing conventions.

At this point, the conference attendees can engage in a typical collaborative videoconferencing arrangement, until such point as the presenter signals the end of the conference and stops sharing 144 the application (e.g., closes the application). Once the conference has ended, the next step is to update the document server 136 with any changes that were made to the documents during the conference sharing 142. The presenter can then return to the local machine containing the original documents, and update 146 them as well.

In the context of using HTML forms to communicate with the document server, a form is displayed to the conference presenter indicating which files have changed (according to attributes 162, FIG. 3). The presenter is then requested to submit the form (with appropriate confirmations) to cause the changed documents to be sent to the document server. Alternatively, a windowing environment dialog box can be displayed on a presenter's videoconferencing equipment, prompting the presenter to update the document server.

If the document already exists on the server, the presenter is prompted to confirm overwriting files already present on the server. In one embodiment, the document server incorporates a revision control system to allow a history of documents to be maintained on the server. In this embodiment, for example, when retrieving files from the server, the server can present a list of a current document version as well as previous versions. Different versions can be stored as separate files, or as delta-files containing difference data over previous document versions.

Figure 4:
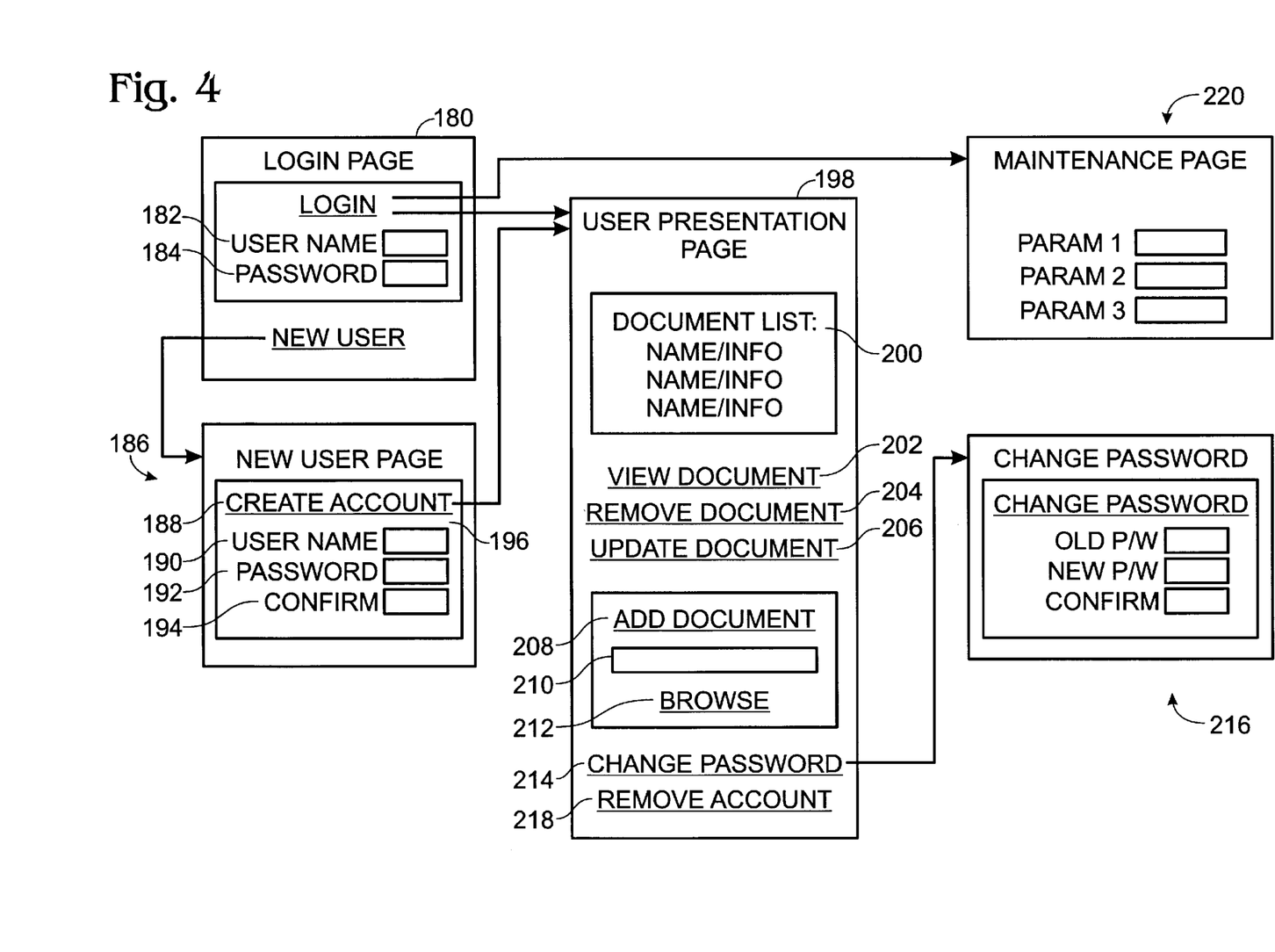
FIG. 4 illustrates information flow in web pages from the document server.

FIG. 4 illustrates the information flow in web pages sent by the document server. That is, as discussed above, the document server interface leads a user through a hierarchy of HTML web pages designed to accomplish the primary goal of uploading presentation documents to a web server and/or viewing the documents stored on the server. This browser interface may also be accessed from the video conferencing PC in order to give a presentation in the video conferencing room. In this scenario, the browser may be shared within a conference. The illustrated information flow takes the user through a login or account setup page to a presentation page built dynamically for each user. The user can then add, remove, update, or view presentation documents.

The first web page accessed by a user is a Login page 180 presenting login name 182 and password 184 fields, as well as a link to a new user account setup 186. Selecting this option generates a form 188 containing input entries for the new user's name 190, password 192, and password entry confirmation 194. Once this information is filled in, a Create Account 196 may be selected to create the new user account. Account creation may be governed by access control data local to conferencing equipment, or accounts may be automatically created by successful domain authentication.

Creating the account takes the new user (or logged in user from form 180) to a user presentation page 198. This page contains a document list object 200 which will display a list of the documents that the user has uploaded to the web server as discussed above. In one embodiment, the list will show a document icon, name, and modification flag for each document. The user may select and highlight a document on the list and then perform an action. The actions will be in the form of buttons to view 202, remove 204, update 206, or add 208 a document. The list may show multiple entries for each document to identify different formats for a document, allowing the user to select a document of a specific format.

The document list object 200 can be implemented as a Java object that displays the list of presentation documents and provides the capability to select one of the documents in preparation to performing an action on the document.

An alternate implementation utilizes an ActiveX object. The data used to populate the presentation list can be downloaded as a separate data file for use by the object, or embedded directly into the web page as input data for the object. Creation of this data file, or embedding of the data into the web page is performed by a server side extension DLL 112. Alternatively, the file list can be generated with an ActiveX control and ASP files.

To upload a document, there is an Add Document button 208 with an associated input entry box 210 and Browse button 212. Selection of the Browse button will open the Windows 95 (or equivalent) common file browse dialog for the user to find and select the document file to upload. To provide support for multiple file documents this browse dialog may need to provide selection of a folder. Closing of this dialog will fill in the input entry box with the file path and name. The user may also type in the file path and name directly.

As discussed above (see FIG. 3), selecting the Add Document button will perform the actual file upload and cause the page to refresh with the new file listed as one of the user's stored documents. The input entry box will be an HTML input tag with type=File. The Add Document button will link to the server extension DLL, passing arguments that include the file name and action to perform. Alternatively, an ActiveX control can be implemented to provide a multiple-file upload capability, where each file can be uploaded with a designated file format. Other proprietary controls can be used as well to control file uploads.

In one embodiment, that is also an additional action button (not shown) to create a web based (HTML) presentation for the document. Selection of a document and subsequent selection of this button will execute software (e.g., Net-It Now! by Net-It Now Web Design of Brussels, Belgium) to dynamically generate a presentation of the document using HTML web pages. In an alternate embodiment, creation of the HTML based presentation occurs automatically in the background when a document is uploaded to the document server.

The Presentation page 198 also contains several user maintenance links, such as an option to change one's password 214 which links to a Change Password page 216. There is also a link 218 to remove the user account which can be handled by an extension DLL 112 (FIG. 1B) action to delete all user documents and remove the user directory from the document server. There can also be additional Maintenance Pages 220 for other administrative options, such as selecting auto-document deletion after n days, displaying user access rates, and resources used.

In one embodiment, maintenance actions 220 will be links to server extension DLLs 112 to perform the action or retrieve data. Similarly, the Login 180, Create Account 196, and Change Password 214 options will utilize a Java script (or equivalent) to verify the form entries and then link to a server extension DLL 112 to perform the action.

Returning now to FIG. 1B, the communication between the document server 100 and videoconferencing equipment 102 and HTTP access module 116 can now be more fully described. In one embodiment, the video conferencing software of the conference equipment utilizes ActiveX controls to access the server 100. For example, the HTTP access module can use several available COM interfaces, such as IMoniker to optimize the server access. The majority of document server actions performed can be accomplished by requesting an extension DLL Uniform Resource Locator (URL) and passing parameters identifying the action.

Thus, assuming the videoconferencing equipment 102 executes a routine to possibly browse for, and retrieve, required documents from the document server 100, the routine can make a request to an extension DLL 112 to return a list of registered user names. (For example, see the "Prepare Wizard" of the Intel TeamStation videoconferencing apparatus by Intel Corporation of Santa Clara, Calif. This Wizard can interface with a document server to locate data files stored on the server.) This list will be returned as a plain or formatted text file, and may contain a flag indicating whether or not each user name requires a password to login to the document server.

To login to the document server, the videoconferencing equipment 102 can request an extension DLL 112 that can be identical or similar to the login request that occurs from the browser Login page 180 (FIG. 4). HTTP data for the browser Presentation Page 198 (returned from successful login or account creation) is returned by the extension DLL, and includes a list of the user documents stored on the document server. Before a document is allowed into the presentation file list (e.g., the list of files to use during the conference) from the document server file list, the video conferencing software can check to verify that an associated application exists on the computing device for each file. The associated application may be provided by the invention, or provided by a thirdparty file viewer. If no related application exists, the user can be prompted whether to add the document anyway. (If the user tries to preview or launch this document, a standard windows dialog asking for an associated application will pop up.)

Since HTTP is technically a stateless protocol (absent usage of keep-alive or equivalent options), in order to link user actions together as a single session, HTTP "cookies" are used. Upon successful login or account creation, a cookie is set in the returned page containing the user name. This cookie is sent by the browser to the server for each subsequent HTML page accessed from the document server. The server extension DLLs 112 (FIG. 1B) will use the cookie to identify the user name for each request. The cookie will be deleted if the Remove Account action is requested, when the conference terminates, if the browser is closed/exited, or a logoff request received.

Figure 5:
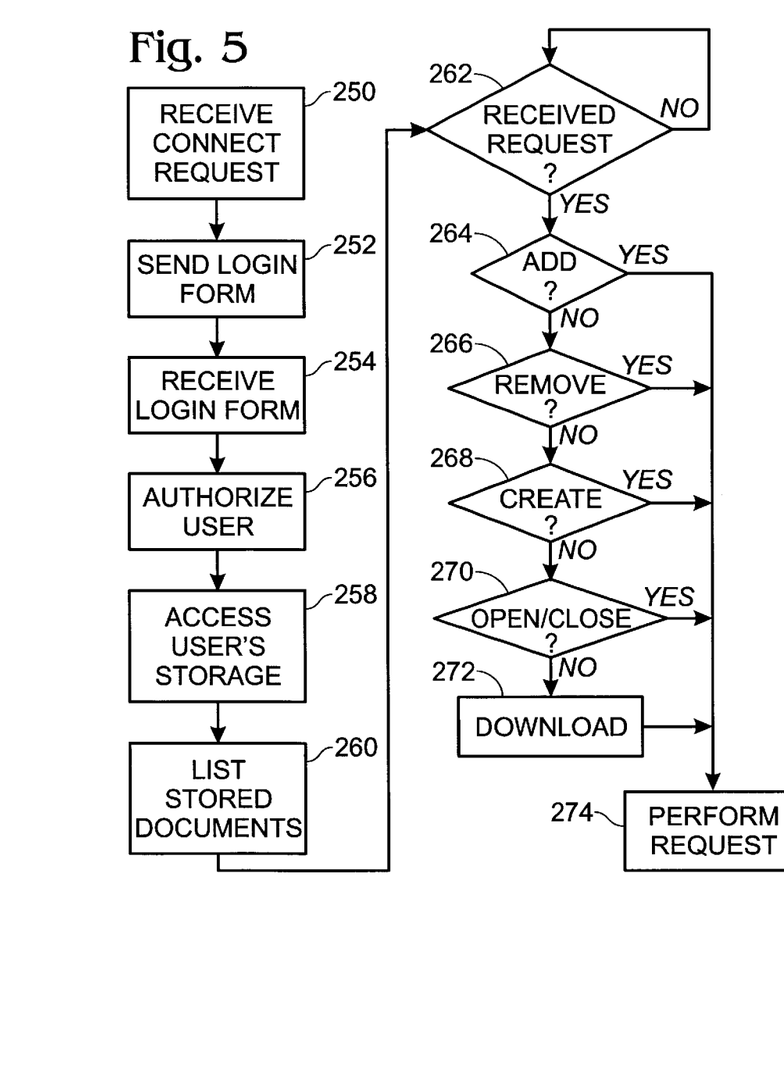
FIG. 5 illustrates communication between a document server and a presenter.

FIG. 5 is a flowchart illustrating data communication between the document server 100 (FIG. 1A) and a user/presenter (e.g., presenter 1 104).

The document server first receives a connection request 250 from a presenter. As discussed above, it is presumed that communication is web based, and therefore the user is utilizing a web browser 110 (FIG. 1B) that has been directed at the document server's internal HTTP server/extensions 112 (FIG. 1B).

In response the server 100 sends 252 the user's browser 110 a log in form encoded in HTML or other format (e.g., Java, ActiveX, etc.). The user fills the form out and the server receives 254 the filled out form. The server uses the form data to authenticate 256 the user's access to the server. Authentication may be by any desired format, such as Windows NT challenge/response, basic authentication, and HTTPS user/password form, local lookup through a server access list, and the like. Authentication can also be performed through another server, such as a Windows NT Domain Server, Novell server, or Kereberos authentication server.

Once the user has been properly authenticated, the server 100 accesses 258 the user's local server storage, and sends 260 a list of stored documents to the user. As discussed above, the storage contains the data that the user intends to share during a conference. On initial contact, the list will probably be empty unless the document server is configured to supply default documents.

The server 100 then waits to receive 262 further requests from the user. Such requests can include add a document 264, remove a document or folder (if hierarchical folder-views are presented to the user instead of a simple list) 266, create a folder 268, and open/close 270 a folder (expand/collapse a hierarchy level). In one embodiment, processing 274 these requests is handled through generation of HTML forms, and/or Microsoft ASP forms. Another request is a "download" 272 option, which links to a file to download to a machine (e.g., to copy something back to presenter 1's local machine (104, FIG. 1A)). Processing 274 of the link will be according to the conventions of the user's browser/Internet application 110 (FIG. 1B). For example, selecting a file to download may open a local application program, run a browser "helper" application, prompt for further information, etc. (Note that a general processing box 274 is indicated to represent the corresponding execution of the related task, even though processing may be performed by separate program subroutines.)

Figure 6:
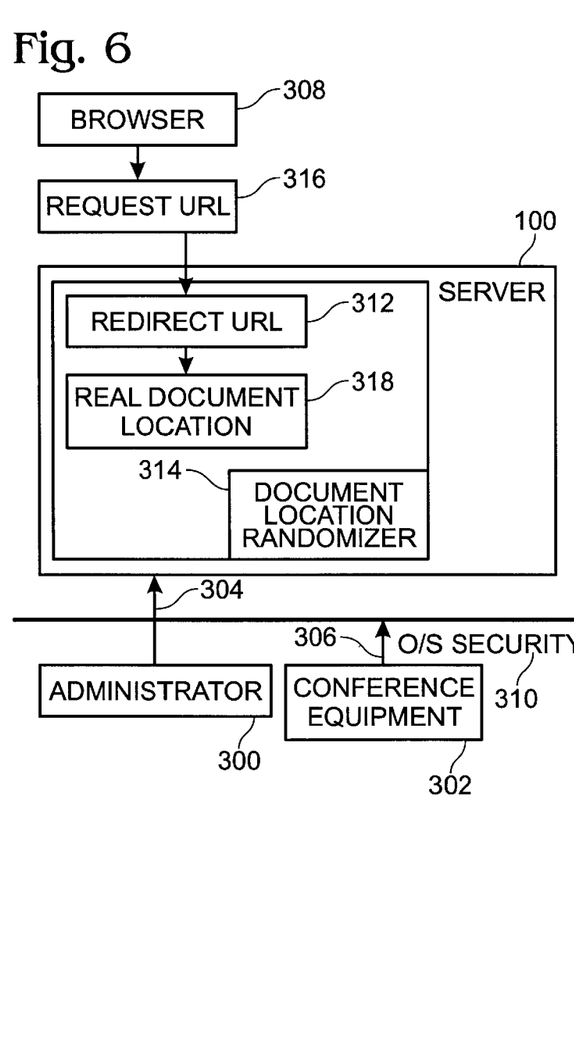
FIG. 6 illustrates securing access to documents on the document server.

FIG. 6 illustrates one method for securing access to documents stored on the document server 100 (FIG. 1A). As discussed above, the document server 100 simplifies the process of getting conference documents to the videoconferencing equipment 102 by temporarily storing the documents for retrieval by the conferencing equipment. However, since the document server is generally available on a network, the stored documents should be secured against unauthorized access by other users of the conferencing equipment. For example, let us assume that both presenters 104, 106 of FIG. 1 have uploaded conference documents to the document server 100 for use videoconferencing equipment 102. It is desirable that presenter 2 be unable to access documents prepared by presenter 1.

There are two general approaches to the problem. In the first approach, file system security permissions can be applied to the files. For example, if the videoconferencing equipment 102 utilizes the Windows NT operating system, then different NT users can be added to the system, and local files designated as only readable by a particular user. A problem with this approach, however, is that it is not trivial to properly add and remove users to an NT environment, and such operations are usually performed manually. Given that most conference user accounts are transitory, manual user administration would be very cumbersome. Thus, unless tools are provided to script or otherwise automate adding and removing user accounts, a more efficient URL hiding method can be employed. (Note that domain authentication, e.g., with Windows NT domain accounts, can be used to authenticate users.)

In this second approach of URL hiding, documents stored on the document server are secured against two different methods of unauthorized access. First, access to documents can be attempted from anywhere on the network 108 (FIG. 1A) using a browser or other network application. Second, access to documents may also be attempted by users of the conferencing equipment itself. That is, if the document server 100 resides on the videoconferencing equipment 102, then video conferencing participants have direct access to the system hard drive containing the stored documents. (When the document server 100 is separate from the videoconferencing equipment 102, then the document server can be placed in a physically secure location.)

Assuming that the server 100 and videoconferencing equipment 102 are combined, and a user has direct access to the document server 100, security features of the host operating system can be used. Rather than creating accounts for each conference user, instead only an administrator account 300 and a generic conference equipment user account 302 is created. The properties of all document server files, including user uploaded files, have their access read, write, execute permissions set so that only the administrator account may utilize 304 the files. Consequently, any other access attempts 306 by non-privileged accounts is prevented by file-level access security 310 provided by the host operating system. Users other than the administrator 300 can only access the document server 100 documents using a web browser 308 or other interface provided by conferencing equipment.

Under the traditional HTTP file-access paradigm, in order for the document server's web server components 112 (FIG. 1B) to serve stored documents to a browser 308 (or equivalent) application, the documents must be stored in a location that can be accessed by any anonymous web browser client.

However, since available documents are presented to a user 308 as a list (or folder view) of document URLs, a user can inspect the URLs to determine naming conventions and then attempt to access privileged documents of another user. To avoid this, in one embodiment, the document server 100 implements URL redirection 312 and randomization 314 of document locations within the local storage of the server 100.

The document server can protect against identifying actual URL addresses by listing a fictitious (virtual) URL in the document list shown to the browser client. For example, a fictitious URL can be of the form "HTTP://-hostname/ShowUsers/username/documentname." This virtual URL is requested 316 by a browser 308, received by the web server, recognized as a virtual address, and then redirected 312 to a real document location 318. In one embodiment, redirection is effected by redirecting the access attempt to the document server 100 (FIG. 1A) HTTP extensions 112 (FIG. 1B), and passing to the server the document name and user name obtained from the original URL. The document server 100 then instructs the web server 112 to return the actual document 318 using the document's actual URL. But, since the browser 308 receives a data stream in response to the original URL request 316, the browser client (and hence its user) never becomes aware of the actual URL used.

An actual document URL can be of the form "HTTP://hostname/ShowServer/UsersXXX/username/docname." As extra protection against a browser client determining the actual document URL, the "XXX" portion of "UsersXXX" can be periodically renamed 314 to a random combination of alphanumeric characters (here an exemplary 3-character sequence is randomized). Renaming can be scheduled to occur according to elapsed time (e.g., perhaps daily with an operating system scheduler such as "cron" or "at"), and/or according to every nth document server access.

As an additional measure of protection, before the server 100 instructs the HTTP server extensions 112 to return the actual document, the existence of the document referenced in the URL is first verified. This forestalls the HTTP server 112 presenting an "error 104 not found" result which would include the actual URL 318 that could not be located. If verification indicates that the document does not exist, the server can return a different error document in response to the request 316 to indicated that the document is unavailable.

Figure 7:
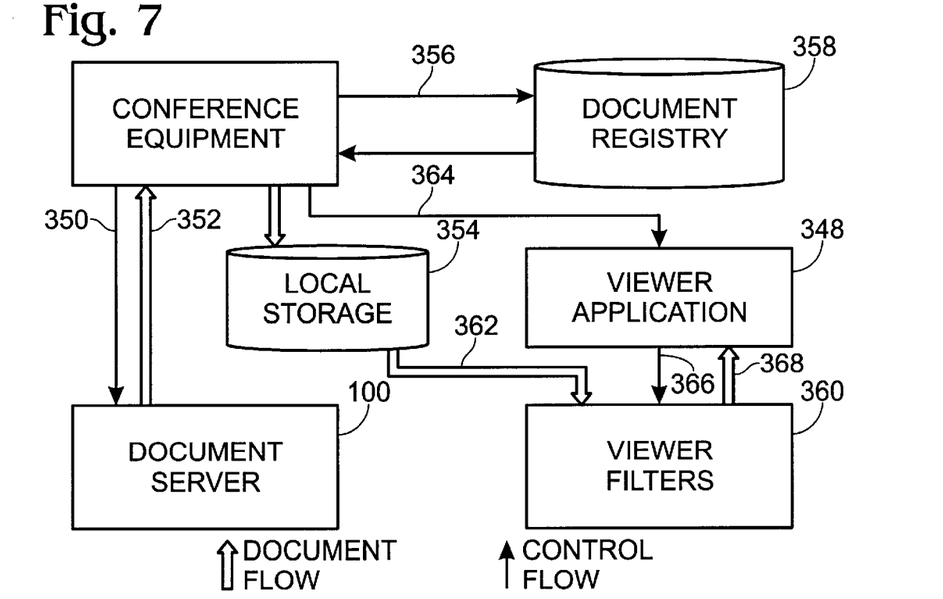
FIG. 7 illustrates viewing documents on conference equipment.

FIG. 7 illustrates viewing documents without a corresponding document application program installed on the videoconferencing equipment 102 (FIG. 1A).

Instead of requiring each conference attendee to have a document's creating application, a viewer application (e.g., a program that supports displaying a wide variety of different file types) is used to display a conference document. In one embodiment, the viewing application is integrated into the videoconferencing equipment 102.

As shown. a document is retrieved from a document server 100, and displayed by a document viewer 348 as follows. First, a user of the conference equipment requests 350 the document from document server 100 using the HTTP (or other) protocol as discussed above. The document server returns 352 the requested document to the browser (which is stored in a browser cache). The conference equipment stores the document onto local disk storage 354, and accesses 356 a document registry 358 (stored within a system registry) to identify an associated application for the document (e.g., Microsoft Word, etc.).

Then conference equipment then launches 364 the viewer application 348 to display the document. The viewer application accesses 366 viewer filters 360 to load and format the document, and then loads 362 the document from the local disk storage 354. A formatted version of document for display is returned 368 for display by the viewer application (e.g., in a display window associated with the viewer application; see FIG. 8).

Installation of the viewer application 348 requires registering the application to handle all file types (e.g., into the document registry 358). Assuming that the conference equipment resides on a Windows NT system, registration includes adding the document registry 358 entries into the general system registry to associate each file type with the viewer application 348. Provision can be made for pre-existing registrations, e.g., to leave such registrations alone, or prompt regarding replacement, so that improved viewers can be utilized as necessary or desired.

When pre-loading a conference document within video-conferencing equipment 102 (e.g., as performed by the TeamStation), the system 102 is searched for an associated application. This search will identify the viewer application. The conference equipment then launches the associated viewer application to display the document either before or during a conference. Preferably, the viewer interface is integrated into the conference application's interface.

Figure 8:
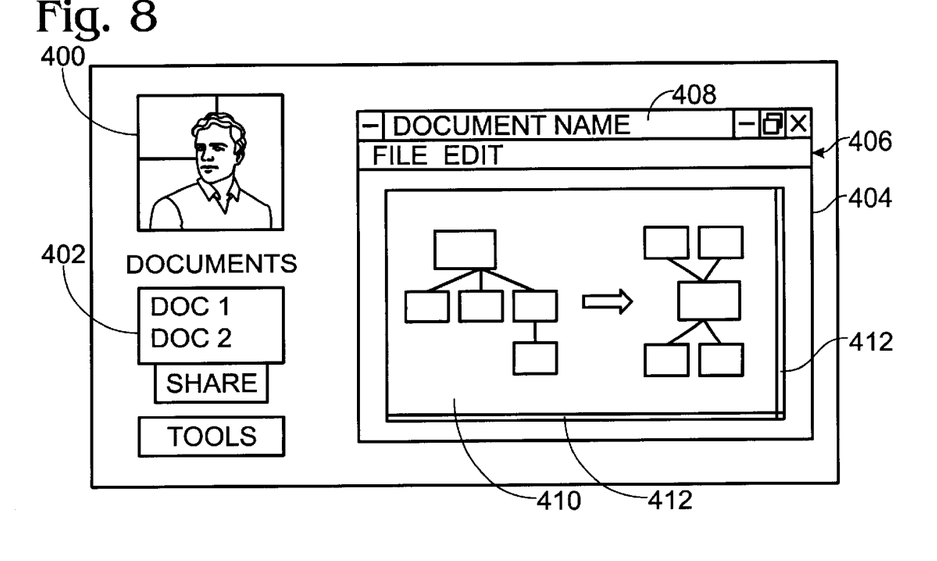
FIG. 8 shows a viewer application integrated with conference equipment.

FIG. 8 illustrates an exemplary viewer application that has been integrated into the environment for the videoconferencing equipment 102 (FIG. 1A). As shown, a conference participant 400 is sharing some documents 402 during a video conference. On selecting one of the documents, a parent viewing window 404 is displayed. This window 404 contains a simple menu 406 having basic File and Edit operations such as Save, Save As, Open, Close, and copy to clipboard. There is also a title bar 408 containing the name of the document being viewed. A child viewing pane 410 displays the contents of viewed file. The pane 410 includes scroll bars 412 if the document content does not fit within the viewer pane. The viewing window 404 also includes sizeable borders to allow positioning and sizing of the viewing window 404.

Displaying documents in the viewing pane 410 can be achieved by using document filters 360 (FIG. 7) that can interpret the document file format and render a displayable image. Several such filters exist as commercial software APIs that can be integrated into the viewer application. The filters may also provide additional user interface features within the viewer window that are unique to the document being viewed, such as right mouse-click context sensitive menus, document navigation controls, full-screen viewing, and the like.

Figure 9:
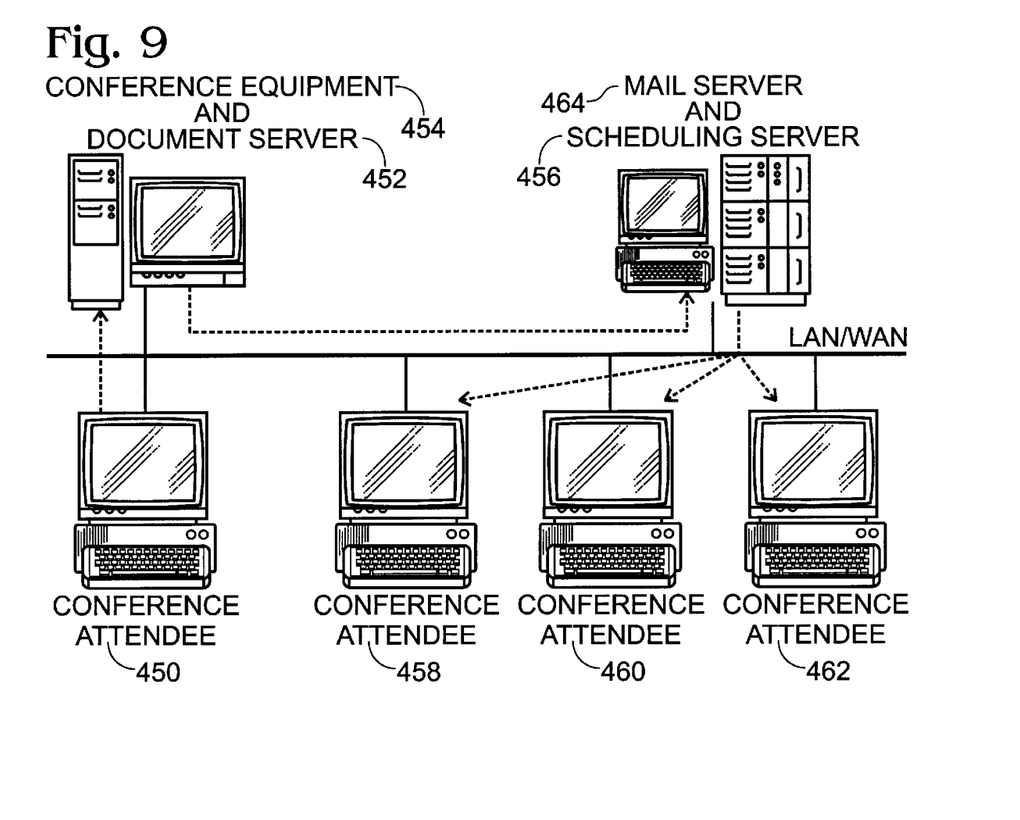
FIG. 9 illustrates E-mail based document transfer.

FIG. 9 show one embodiment of the invention in which documents to be shared during a videoconference are transferred through E-mail. For example, at the conclusion of a conference session, shared documents can be automatically transmitted to the videoconference participants. Distribution of shared conferencing documents is integrated into the overall video conferencing scheme discussed above.

For example, a conference attendee 450 stores documents on a document server 452 in preparation for an upcoming video conference. The document server may operate as an independent machine, or as illustrated, in combination with the videoconferencing equipment 454 where the conference is to be held, or on other conferencing equipment entirely. The physical location is unimportant, since communication with the document server is made over a Local Area Network; (LAN) or a Wide Area Network (WAN) with a location independent protocol, e.g., HTTP.

The attendee can use a network scheduling server 456 to arrange for the conference. This scheduler may reside on conferencing equipment, or as shown, may be an independent machine reachable over a network link. It may also be based on or integrated with a public-access server providing scheduling services to customers, e.g., the "Yahoo! Calendar" by Yahoo! Inc. of Santa Clara, Calif. (http://calendar.yahoo.com). The scheduler may also be integrated into the document server 452. The scheduler 456 records conference attendees 450, 458, 460, 462 and a list of all documents or data that was shared during the conference. A mail server 464 (shown as integrated with the scheduler) can distribute an advance-warning of the conference to all conference participants. This message contains a meeting agenda, an indication of documents to share, and other conference-related information.

At conclusion of the conference, any modified documents are sent back to the document server 452 to update its stored copy of the conference documents. These documents are also distributed by the document server or hosting conferencing equipment 454 to all conference attendees 450, 458, 460, 462 by interfacing with the electronic mail server 464. An electronic mail message is composed containing an optional digest or summary of the conference, a list of conference attendees and their contact information, along with all shared documents saved as attachments to the message. The message will also contain the date, time, and duration of the conference. This message is then submitted to the mail server 464 for delivery. Thus, traditional mail services can be advantageously integrated into collaborative videoconferencing, to further facilitate the transfer of conference documents to appropriate parties.

Figure 10:
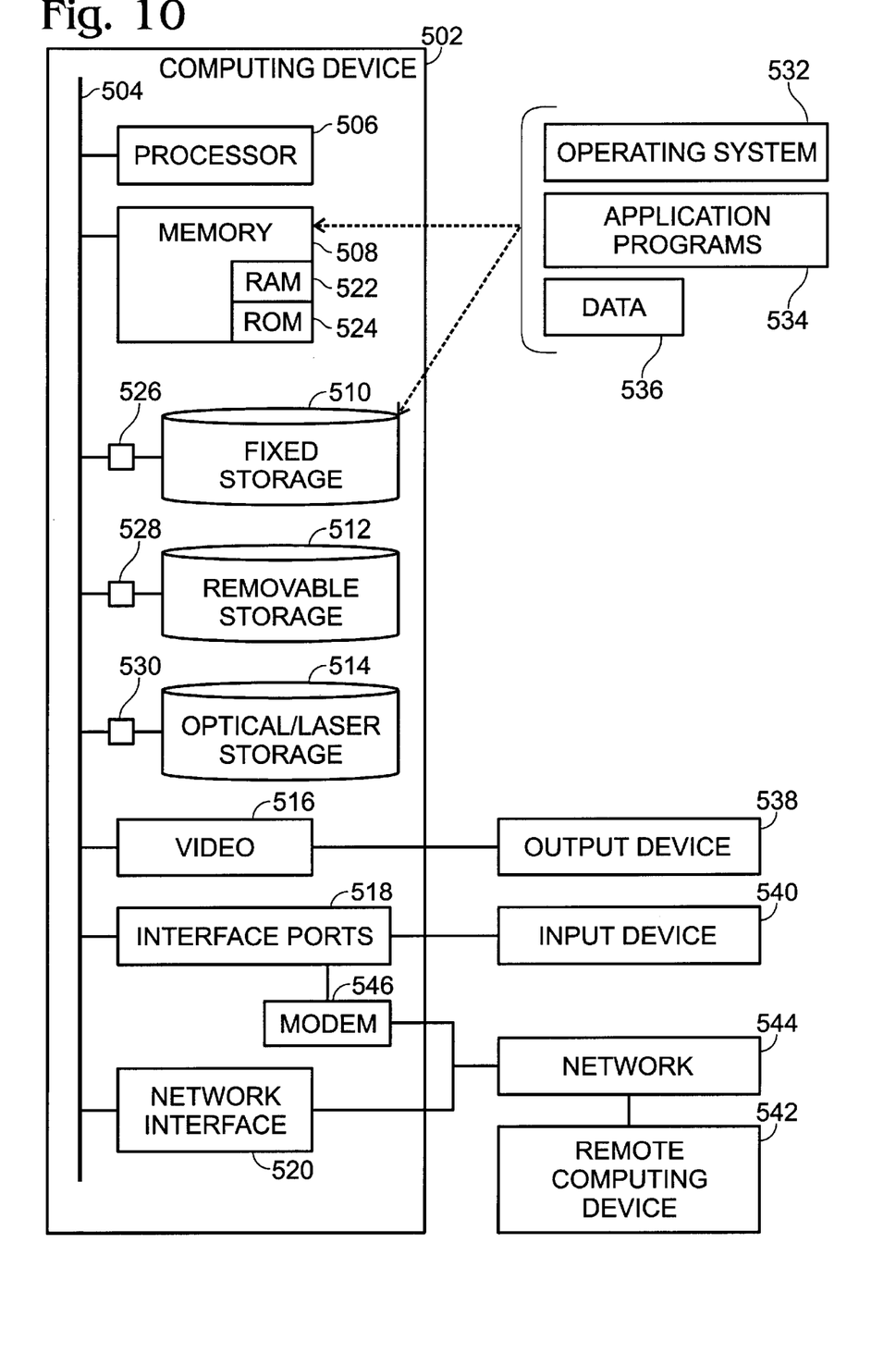
FIG. 10 shows an example operating environment for claimed embodiments of the invention.

FIG. 10 and the following discussion are intended to provide a brief, general description of a suitable computing environment in which the invention may be implemented. The invention may be described by reference to different high-level program modules and/or low-level hardware contexts. Those skilled in the art will realize that program module references can be interchanged with low-level instructions.

Program modules include procedures, functions, programs, components, data structures, and the like, that perform particular tasks or implement particular abstract data types. The modules may be incorporated into single and multi-processor computing systems, as well as hand-held devices and controllable consumer devices. It is understood that modules may be implemented on a single computing device, or processed over a distributed network environment, where modules can be located in both local and remote memory storage devices.

An exemplary system for implementing the invention includes a computing device 502 having system bus 504 for coupling together various components within the computing device. The system 504 bus may be any of several types of bus structure including a memory bus or memory controller, a peripheral bus, and a local bus using any of a variety of conventional bus architectures such as PCI, AGP, VESA, Microchannel, ISA and EISA, to name a few. Note that only a single bus is illustrated, although plural buses typically achieve performance benefits. Typically, attached to the bus 502 are a processor 506, a memory 508, storage devices (e.g., fixed 510, removable 512, optical/laser 514), a video interface 516, input/output interface ports 518, and a network interface 520.

The processor 506 may be any of various commercially available processors, including Intel processors, or the DEC Alpha, PowerPC, programmable gate arrays, signal processors, or the like. Dual, quad processors, and other multi-processor architectures also can be used. The system memory includes random access memory (RAM) 522, and static or reprogrammable read only memory (ROM) 524. A basic input/output system (BIOS), stored in ROM, contains routines for information transfer between device 502 components or device initialization.

The fixed storage 510 generally refers to hard drive and other semi-permanently attached media, whereas removable storage 512 generally refers to a device-bay into which removable media such as a floppy diskette is removably inserted. The optical/laser storage 514 include devices based on CD-ROM, DVD, or CD-RW technology, and are usually coupled to the system bus 504 through a device interface 526, 528, 530. The storage systems and associated computer-readable media provide storage of data and executable instructions for the computing device 502. Note that other storage options include magnetic cassettes, tapes, flash memory cards, memory sticks, digital video disks, and the like.

The exemplary computing device 502 can store and execute a number of program modules within the RAM 522, ROM 524, and storage devices 510, 512, 514. Typical program modules include an operating system 532, application programs 534 (e.g., a web browser or network application program), etc., and application data 536. Program module or other system output can be processed by the video system 516 (e.g., a 2D and/or 3D graphics rendering device), which is coupled to the system bus 504 and an output device 538. Typical output devices include monitors, flat-panels displays, liquid-crystal displays, and recording devices such as video-cassette recorders.

A user of the computing device 502 is typically a person interacting with the computing device through manipulation of an input device 540. Common input devices include a keyboard, mouse, tablet, touch-sensitive surface, digital pen, joystick, microphone, game pad, satellite dish, etc. One can also provide input through manipulation of a virtual reality environment, or through processing the output from a data file or another computing device.

The computing device 502 is expected to operate in a networked environment using logical connections to one or more remote computing devices. One such remote computing device 542 may be a web server or other program module utilizing a network application protocol (e.g., HTTP, File Transfer Protocol (FTP), Gopher, Wide Area Information Server (WAIS)), a router, a peer device or other common network node, and typically includes many or all of the elements discussed for the computing device 502. The computing device 502 has a network interface 520 (e.g., an Ethernet card) coupled to the system bus 504, to allow communication with the remote device 542. Both the local computing device 502 and the remote computing device 542 can be communicatively coupled to a network 544 such as a WAN, LAN, Gateway, Internet, or other public or private data-pathway. It will be appreciated that other communication links between the computing devices, such as through a modem 546 coupled to an interface port 518, may also be used.

In accordance with the practices of persons skilled in the art of computer hardware and software programming, the present invention is described with reference to acts and symbolic representations of operations that are sometimes referred to as being computer-executed. It will be appreciated that the acts and symbolically represented operations include the manipulation by the processor 506 of electrical signals representing data bits which causes a resulting transformation or reduction of the electrical signal representation, and the maintenance of data bits at memory locations in the memory 508 and storage systems 510, 512, 514, so as to reconfigure or otherwise alter the computer system's operation and/or processing of signals. The memory locations where data bits are maintained are physical locations having particular electrical, magnetic, or optical properties corresponding to the data bits.

Having described and illustrated the principles of the invention with reference to illustrated embodiments, it will be recognized that the illustrated embodiments can be modified in arrangement and detail without departing from such principles.

For example, while the foregoing description focused—for expository convenience—on collaborative videoconferencing based in part on a document server utilizing database and HTTP/HTML protocols, it will be recognized that the same techniques and analyses can be applied to different database configurations, such as remote or distributed database, and alternate communication protocols. Consequently, in view of the wide variety of networks and protocol options, the detailed embodiments are intended to be illustrative only, and should not be taken as limiting the scope of the invention. What is claimed as the invention, is all such modifications as may come within the scope and spirit of the following claims and equivalents thereto.

What is claimed is:

1. A document-collaboration videoconferencing system between a first and a second conference attendee, the system comprising:

a document server comprising a web server;

a presenter computing system; and a first conferencing computing system;

wherein the presenter computing system transfers a document to the document server over a network, the document server sends a stored documents list to the presenter, and the first conferencing system copies the document over the network from the document server.

2. A system according to claim 1, in which the document server comprises:

a database to store the document;

wherein web pages are transmitted by the web server to cause transfer of the document from the document server to each conferencing system.

3. A system according to claim 2, in which each conferencing computing system comprises:

an HTTP access module in communication with the document server over the network.

4. In a videoconferencing system, a method for a presenter device to provide documents for collaborative sharing, the method comprising:

providing an at least one document server with at least one document to share during a document-collaborative videoconference, wherein the document server comprises a web server, and wherein the document server sends a stored documents list to the presenter device;

providing plural conferencing computing devices to obtain a local copy of the at least one document;

holding a document-collaborative videoconference with conference attendees; and updating the document server with a revised copy of the at least one document.

5. A method according to claim 4, wherein holding the document-collaborative videoconference comprises:

connecting each conference attendee;

opening an application program associated with the at least one document to share; and sharing the application program with each conference attendee.

6. A computer readable medium having computer instructions encoded thereon capable of causing a processor to perform the steps of claim 5.

7. A method according to claim 5, wherein sharing the application program for a shared document comprises:

opening a document viewer application;

locating a viewing filter for the shared document; and displaying the shared document according to the viewing filter;

wherein the document viewer application removes need for an originating application for the shared document being installed on a conferencing computing device.

8. A method according to claim 4, wherein providing the at least one document server comprises:

receiving a connection request from a presenter computing device;

receiving a login form from the presenter device, such completed form including presenter user data;

authorizing the presenter user data; and accessing user storage.

9. A computer readable medium having computer instructions encoded thereon capable of causing a processor to perform the steps of claim 8.

10. A method according to claim 8, further comprising:

receiving a command request from the presenter computing device;

wherein such command is a selected one of select a file, add a file, move a file, copy a file, remove a file, download a selected file to the presenter device, add a folder, move a folder, copy a folder, remove a folder, create a folder, expand a folder, collapse a folder, and download a selected folder to the presenter device.

11. A method according to claim 4, wherein providing a conferencing computing device with a document server comprises:

receiving a URL request for a document stored on the document server;

redirecting the URL to a protected URL location; and transmitting data at the protected URL location to the conferencing computing device so that such device is unaware of redirection.

12. A computer readable medium having computer instructions encoded thereon capable of causing a processor to perform the steps of claim 11.

13. A method according to claim 11, the method further comprising:

embedding a random alphanumeric sequence into the protected URL; and periodically changing the embedded random alphanumeric sequence.

14. A videoconferencing system for providing documents for collaborative sharing, comprising:

means for a presenter device to initialize an at least one document server with at least one document to share during a document-collaborative videoconference, wherein the document server comprises a web server;

means for providing plural conferencing computing devices to obtain a local copy of the at least one document;

means for holding a document-collaborative videoconference with conference attendees;

means for updating the document server with a revised copy of the at least one document; and means for sending a stored documents list to the presenter device.

15. A system according to claim 14, wherein means for holding the document-collaborative videoconference comprises:

means for connecting conference each conference attendee;

means for opening an application program associated with the at least one document to share; and means for sharing the application program with each conference attendee.

16. A system according to claim 15, wherein means for sharing the application program comprises:

means for opening a document viewer application;

means for locating a viewing filter for the shared document; and means for displaying the shared document according to the viewing filter.

17. A system according to claim 14, wherein means for providing the at least one document server comprises:

means for receiving a connection request from a presenter computing device;

means for receiving a login form from the presenter device, such completed form including presenter user data;

means for authorizing the presenter user data; and means for accessing user storage.

18. A method according to claim 14, wherein means for providing a conferencing computing device to obtain a local copy of the at least one document, comprises:

means for receiving a URL request for a document stored on the document server;

means for redirecting the URL to a protected URL location;

means for embedding a random alphanumeric sequence into the protected URL; and means for periodically changing the embedded random alphanumeric sequence.

* * * * *

UNITED STATES PATENT AND TRADEMARK OFFICE
CERTIFICATE OF CORRECTION

PATENT NO. : 6,317,777 B1
DATED : November 13, 2001
INVENTOR(S) : Skarbo et al.

It is certified that error appears in the above-identified patent and that said Letters Patent is hereby corrected as shown below:

Column 3,
Line 44, delete "aid", insert -- and --.
Line 45, delete "TerminateExtensiono", insert -- TerminateExtension --.

Column 11,
Line 42, delete "show", insert -- shows --.

Signed and Sealed this

Eighteenth Day of June, 2002

Attest:

JAMES E. ROGAN
Attesting Officer   Director of the United States Patent and Trademark Office